E. G. FELTHOUSEN.
NUT-LOCK.
No. 182,653.     Patented Sept. 26, 1876.
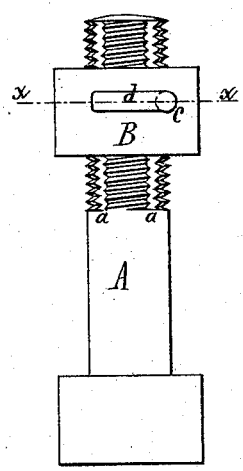
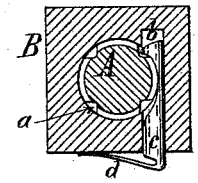
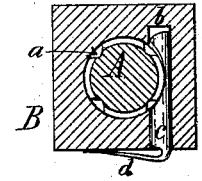

UNITED STATES PATENT OFFICE.

EDWARD G. FELTHOUSEN, OF BUFFALO, NEW YORK.

IMPROVEMENT IN NUT-LOCKS.

Specification forming part of Letters Patent No. 182,653, dated September 26, 1876; application filed August 26, 1876.

*To all whom it may concern:*

Be it known that I, EDWARD G. FELTHOUSEN, of the city of Buffalo, in the county of Erie and State of New York, have invented certain Improvements in Nut-Locks, which improvements are fully set forth in the following specification, reference being had to the accompanying drawing.

My invention relates to that class of devices which are designed for preventing the casual unscrewing of the nuts of fish-joints, carriage-bolts, and other devices subjected to a jarring action.

My invention consists in providing the nut with a locking-bolt arranged in a cavity in the nut, and held in engagement with a longitudinal groove of the screw-bolt by means of a spring or other elastic part, so as to prevent the unscrewing of the nut except when the locking-bolt is disengaged from the groove of the screw-bolt.

In the accompanying drawing, Figure 1 is a side elevation of a bolt and nut provided with my improved nut-lock. Fig. 2 is a horizontal section in line $x\ x$, Fig. 1, showing the locking-bolt engaged. Fig. 3 is a similar view, showing the locking-bolt disengaged.

Like letters of reference refer to like parts in each of the figures.

A represents a screw-bolt, having its threaded portion provided with a number of longitudinal grooves, $a$. B is the screw-nut, constructed with a bore or cavity, $b$, arranged tangential to the thread of the nut, and extending past the same, as clearly shown in Figs. 2 and 3. $c$ represents the locking-bolt arranged in the cavity $b$ of the nut B, and provided at its inner end with a hook-shaped projection engaging in the groove of the screw-bolt.

The locking-bolt is preferably made of cylindrical form, and cut away at the side adjacent to the screw-bolt, so as to fit against the same while permitting a limited longitudinal movement of the bolt $c$.

$d$ is a flat spring, arranged at the outer end of the bolt $c$, and preferably formed in one piece therewith, as shown, so as to bear with its free end against the outside of the nut. The spring $d$ retains the inner hooked end of the locking-bolt in engagement with the respective groove $a$ of the screw-bolt, as shown in Fig. 2, thereby preventing the unscrewing of the nut until the bolt $a$ is pressed inwardly sufficient to withdraw the inner hooked end of the bolt $a$ from the groove of the screw-bolt, as shown in Fig. 3, when the nut is free to be unscrewed. As soon as the locking-bolt $c$ is released the spring $d$ returns the same to its former position in engagement with the groove of the screw-bolt.

In applying the screw-nut, the inner concave surface of the locking-bolt comes in contact with the side of each groove $a$, which causes the locking-bolt $c$ to be forced inward out of the way when passing a groove, so as to permit the nut to be screwed home without difficulty, while the accidental unscrewing of the nut is effectually prevented.

The locking-bolt $c$ and spring $d$ may, if desired, be constructed of wire bent to the proper shape; but I prefer the construction herein shown and described.

My improved nut-lock is very simple and effective, and can be manufactured at small expense.

Having thus fully described my invention, what I claim as new, and desire to secure by Letters Patent, is—

1. A nut-lock consisting of a bolt or lug arranged in a recess or cavity of the nut, and held in engagement with a groove in the screw-bolt by a suitable spring, so as to prevent the unscrewing of the nut unless the locking-bolt is depressed and disengaged from the groove of the screw-bolt, substantially as hereinbefore set forth.

2. The combination, with a screw-bolt having longitudinal grooves $a$, of the screw-nut B, provided with cavity $b$ and hooked locking-bolt $c$, furnished with a spring, $d$, so that the nut is locked by the bolt $a$ engaging in one of the grooves of the screw-bolt, and released by depressing the locking-bolt, substantially as hereinbefore set forth.

EDWARD G. FELTHOUSEN.

Witnesses:
EDWARD WILHELM,
CHAS. J. BUCHHEIT.